(12) United States Patent
Yuuki

(10) Patent No.: US 8,595,560 B2
(45) Date of Patent: Nov. 26, 2013

(54) INFORMATION PROCESSING APPARATUS AND METHOD

(75) Inventor: Kazuhiro Yuuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/929,535

(22) Filed: Jan. 31, 2011

(65) Prior Publication Data

US 2011/0197095 A1 Aug. 11, 2011

(30) Foreign Application Priority Data

Feb. 5, 2010 (JP) .................................. 2010-023854
Dec. 29, 2010 (JP) .................................. 2010-294451

(51) Int. Cl.
*G06F 11/00* (2006.01)
(52) U.S. Cl.
USPC ........................................................ 714/38.1
(58) Field of Classification Search
USPC ........................................................ 714/38.1
See application file for complete search history.

(56) References Cited

U.S. PATENT DOCUMENTS

| | | | |
|---|---|---|---|
| 6,711,700 B2* | 3/2004 | Armstrong et al. | 714/23 |
| 6,954,884 B2* | 10/2005 | Dean et al. | 714/51 |
| 7,080,285 B2* | 7/2006 | Kosugi et al. | 714/36 |
| 7,162,666 B2* | 1/2007 | Bono | 714/51 |
| 7,580,999 B1* | 8/2009 | Mann et al. | 709/224 |
| 7,966,528 B2* | 6/2011 | Troppmann et al. | 714/55 |
| 2003/0204792 A1* | 10/2003 | Cahill et al. | 714/55 |
| 2007/0294601 A1* | 12/2007 | Chitsaz et al. | 714/55 |
| 2009/0013217 A1 | 1/2009 | Shibata et al. | |
| 2009/0077420 A1 | 3/2009 | Sunavala et al. | |

FOREIGN PATENT DOCUMENTS

| | | |
|---|---|---|
| DE | 102007039441 | 2/2009 |
| JP | 60-251446 | 12/1985 |
| JP | 01-116739 | 5/1989 |
| JP | 01-134637 | 5/1989 |
| JP | 11-085569 | 3/1999 |
| JP | 2004-254088 | 9/2004 |

OTHER PUBLICATIONS

European Patent Office Communication dated Jun. 29, 2011 in Appln. No. 11152972.
Patent Abstracts of Japan, Publication No. 60-251446, Published Dec. 12, 1985.
European Abstract, Publication No. 102007039441, Published Feb. 26, 2009.
European Patent Office Communication dated Jun. 17, 2011 in Appln. No. 11152972.
Patent Abstracts of Japan, Publication No. 01-116739, published May 9, 1989.

(Continued)

*Primary Examiner* — Bryce Bonzo
(74) *Attorney, Agent, or Firm* — Staas & Halsey LLP

(57) ABSTRACT

An information processing apparatus comprising: a plurality of processing units; a plurality of individual monitoring units provided for each of the plurality of processing units, that monitor an operation condition of a corresponding processing unit, and judge whether or not the corresponding processing unit is operating normally, and notify the judgment result for the corresponding processing unit to outside; and an administrative unit connected to the plurality of individual monitoring units, that receives notification from any of the individual monitoring units, and performs troubleshooting processing on a processing unit corresponding to an individual monitoring unit that has made a notification that a corresponding processing unit is not operating normally.

10 Claims, 8 Drawing Sheets

(56) References Cited

OTHER PUBLICATIONS

Patent Abstracts of Japan, Publication No. 01-134637, published May 26, 1989.

Patent Abstracts of Japan, Publication No. 11-085569, published Mar. 30, 1999.

Patent Abstracts of Japan, Publication No. 2004-254088, published Sep. 9, 2004.

* cited by examiner

| BIT | FIELD | CONTENTS |
|---|---|---|
| 7 | ALIVEINT | INTERRUPTION NOTIFICATION |
| 0-6 | DATA | OPERATION INFORMATION |

| BIT | FIELD | CONTENTS |
|---|---|---|
| 7 | RESERVED | SPARE AREA |
| 0-6 | INTERVAL | MONITORING PERIOD |

| MONITORING PERIOD |
|---|
| 0000000 : UNUSED (TIMER STOP) |
| 0000001 : 30 SECONDS INTERVAL |
| 0000010 : 1 MINUTE INTERVAL |
| 0000100 : 2 MINUTES INTERVAL |

| BIT | FIELD | CONTENTS |
|---|---|---|
| 7 | ALIVE INT | INTERRUPTION NOTIFICATION |
| 0-6 | DATA | OPERATION INFORMATION |

| PHASE CODE | OPERATION INFORMATION |
|---|---|
| 01 | RESET CAUSE JUDGMENT PROCESSING |
| 02 | FMEM DIAGNOSIS |
| 03 | CPU OPERATION CONFIRMATION TEST |
| 04 | RAM INITIALIZATION |
| 05 | RAM DIAGNOSIS (1) |
| 06 | RAM DIAGNOSIS (2) |
| 07 | RAM DIAGNOSIS (2) |
| 08 | FMEM → RAM DOWNLOAD |
| 09 | TIMER DIAGNOSIS |
| 0a | SERIAL PORT DIAGNOSIS |
| 0b | LAN DIAGNOSIS |
| 0c | CREATE CONFIGURATION TABLE |
| 0d | ADAPTOR DIAGNOSIS |
| 7f | END |

INFORMATION PROCESSING APPARATUS AND METHOD

CROSS-REFERENCE TO RELATED APPLICATION

This application is based upon and claims the benefit of priority of the prior Japanese Patent Application No. 2010-023854, filed on Feb. 5, 2010, and Japanese Patent Application No. 2010-294451, filed on Dec. 29, 2010, the entire contents of which are incorporated herein by reference.

FIELD

The present invention relates to a technique for monitoring for fault occurrence in an information processing apparatus.

BACKGROUND

In order to improve the reliability of processing in an information processing apparatus, a technique is generally adopted that involves monitoring for the occurrence of a fault in a processor that executes a program, and performing troubleshooting processing.

As a method for performing such monitoring, a method is used in which a watch dog timer is mounted on the processor which is the object monitoring, for example as in the following method. That is to say, when the watch dog timer detects a time out fault, a fault occurrence is notified to an operating system (hereunder OS). At this time, if the situation is such that the OS cannot deal with the fault, the fault occurrence is notified to a service processor that performs collection of hardware information. Furthermore, as another method, there is also a method in which watch dog timers are respectively provided in a plurality of processors, and when one watch dog timer times out, that watch dog timer performs notification of the fault occurrence to the other processor(s).

However, the watch dog timer mounted on a processor in this manner, is usually one capable of detecting hardware faults, but is not provided with sufficient functions for detecting and gathering information of faults attributable to software. Therefore, as yet another method, a method is proposed in which a separate administrative unit independent of the processor, performs monitoring or fault correction processing of the operation conditions of the processor. As an example of such a method, the processor notifies its own operation conditions at predetermined periods, together with a command for controlling startup, stop, and so forth of the monitoring processing, to the administrative unit. On the other hand, the administrative unit, based on the notified operation conditions and the command, judges whether or not a trouble has occurred in the processor, and when detected that a trouble has occurred, performs troubleshooting processing.

Furthermore, as a related art for monitoring operating condition of a system, there has been proposed a technique in which a monitoring object apparatus, that is connected with a monitoring apparatus via network, monitors itself according to an instruction which is received from the monitoring apparatus. In this technique, the monitoring apparatus sends a command for operating the monitoring object apparatus to terminate or re-start the monitoring processing in advance.

The techniques referenced above are described in, for example, Japanese Laid-open Patent Publication No. 01-116739, No. 01-134637, No. 11-85569, and No. 2004-254088.

Here, recently, information processing apparatuses provided with a plurality of processors are becoming popular. Furthermore, the number of processors in a single information processing apparatus is on the rise. In the case of an information processing apparatus provided with such a plurality of processors, a method is generally adopted in which one administrative unit lumps together the operation conditions of the plurality of processors, and monitors these to judge the presence or absence of a trouble, and performs troubleshooting processing on the processor in which a trouble has occurred.

However, in the case in which there are a large number of processors from the view point of improving processing efficiency, when one administrative unit judges, based on the operation conditions of each of the plurality of processors, the presence or absence of a trouble occurrence in each of the processors, the processing load on the administrative unit becomes large. As a result, an obstacle occurs in the processing of the administrative unit, making it difficult to appropriately perform troubleshooting processing.

SUMMARY

In the technique of the disclosure, in an information processing apparatus provided with; a plurality of processing units, and an administrative unit that when a fault occurs in at least one of the plurality of processors, performs troubleshooting processing on a processing unit in which a trouble has occurred, there is provided a plurality of individual monitoring unit corresponding to each of the plurality of processing units. Furthermore, the individual monitoring units judge, based on an operation condition of the corresponding processing unit, whether or not the processing unit is operating normally. On the other hand, the administrative unit, when judged that in at least one of the individual monitoring units, the processor corresponding to that individual monitoring unit is not operating normally, based on the judgment result, performs troubleshooting processing on the processing unit corresponding to the individual monitoring unit that has made the judgment.

The object and advantages of the technique will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 9 is a flowchart of an example of processing in the CPU of the main processor; and.

FIG. 10 is a flowchart of an example of processing in the service processor.

DESCRIPTION OF EMBODIMENTS

First Embodiment

Figure 1:
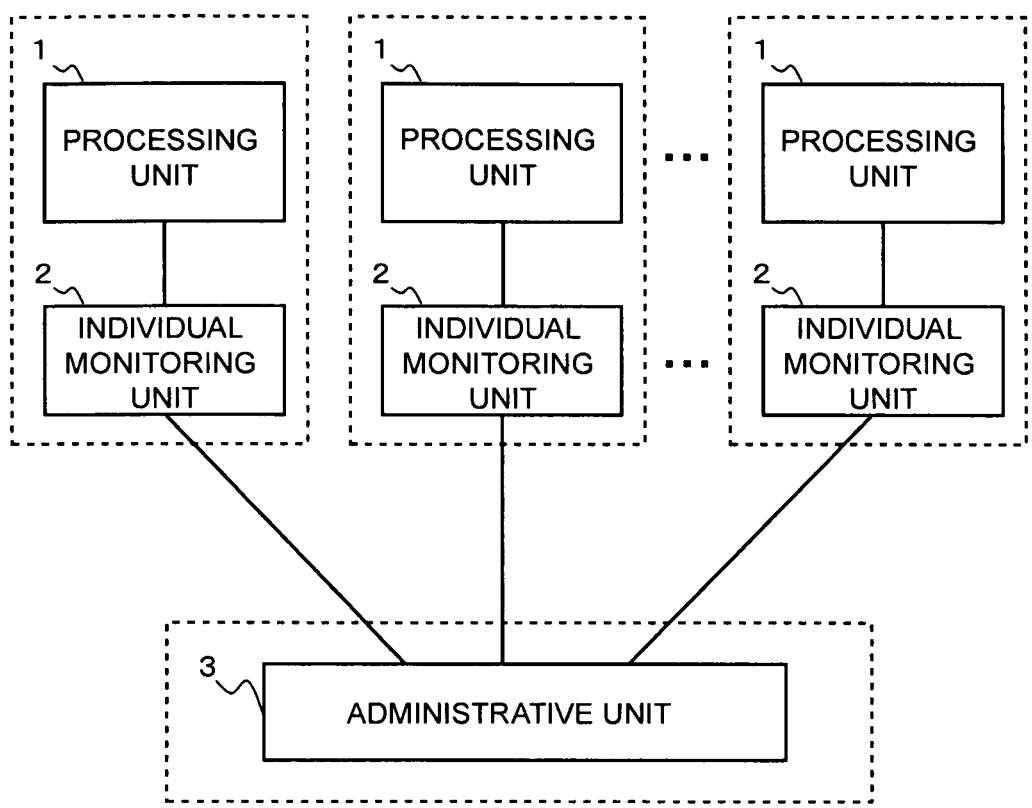
FIG. 1 is a block diagram of an example of an information processing apparatus.

FIG. 1 is a schematic diagram illustrating an outline of an example of an information processing apparatus. This information processing apparatus includes a plurality of processing units 1 (nodes) inside. "Node" may also be used as a term indicating software that operates on a processing unit. However hereunder, expressions of "apparatus" that operates the software as a processing unit or the like and "node" are equal to each other. In the respective processing units 1 an OS is operated to perform program processing.

Furthermore, this information processing apparatus includes a plurality of individual monitoring units 2 provided for each of the respective information processing units 1, that monitor the operation condition of the corresponding processing units 1, and based on the operation condition of the processor 1, judge the presence or absence of a trouble occurrence in the corresponding processing units 1. Furthermore, this information processing apparatus has an administrative unit 3 that, when a trouble occurs in any of the processing units 1, performs troubleshooting processing on that processing unit 1. The troubleshooting processing includes, for example, collecting information related to the cause of a trouble and analyzing the information, and restoring the processor 1 from the trouble by remote control.

Each of the individual monitoring units 2 monitors the operation condition of the corresponding processing unit 1 for each predetermined monitoring period. Then, the individual monitoring unit 2, based on the monitoring result of the operation condition of the corresponding processing unit 1, judges whether or not a trouble has occurred in the corresponding processing unit 1, and only when judged that a trouble has occurred in the corresponding processing unit 1, the individual monitoring unit 2 notifies the trouble occurrence to the administrative unit 3. That is, the administrative unit 3 does not itself perform judgment of the presence or absence of a trouble occurrence based on the operation condition of the processing unit 1, but only acquires, from the individual monitoring units 2, information indicating the judgment result, more specifically, judgment result information indicating a trouble occurrence. Then the administrative unit 3, when it receives notification of a judgment result of a trouble occurrence from any of the individual monitoring units 2, performs troubleshooting processing on the processing unit 1 corresponding to that individual monitoring unit 2.

Figure 2:
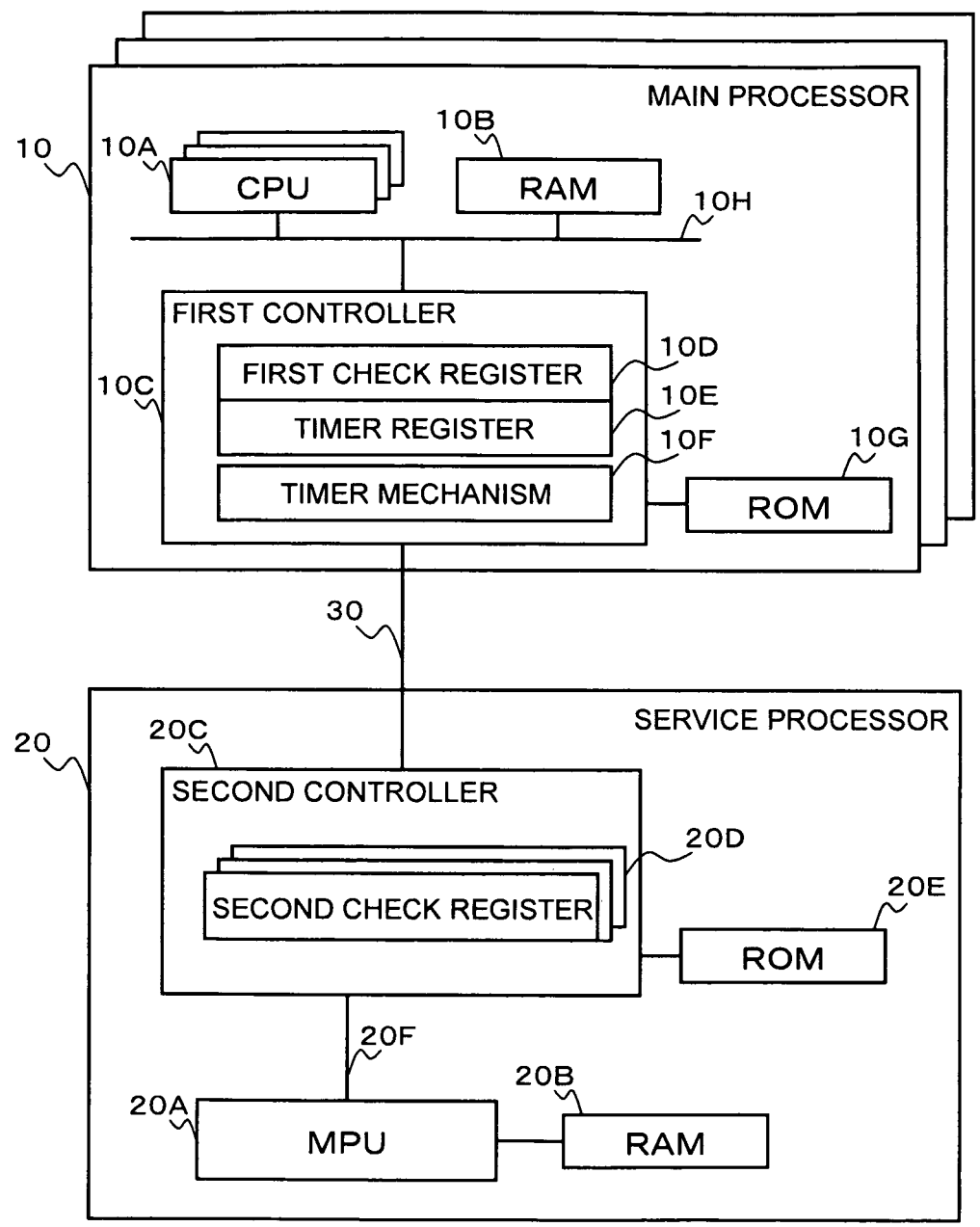
FIG. 2 is an explanatory drawing of an example of a hardware configuration of the information processing apparatus.

Next, this information processing apparatus is described in detail using a specific example of a hardware configuration. FIG. 2 illustrates an example of a hardware configuration of this information processing apparatus. The information processing apparatus includes a plurality of main processors 10, and a service processor 20 that collectively manages devices incorporated in this information processing apparatus (in addition to the main processors 10, for example a power supplying unit, a cooling device and the like), and that performs the monitoring and the remote control of the respective devices. The respective main processors 10 and the service processor 20 are connected via a control bus 30.

Each of the main processors 10 includes; one or more CPU(s) 10A, a RAM (Random Access Memory) 10B, a first controller 10C, and a ROM 10F. The first controller 10C includes a first check register 10D and a timer register 10E and a timer mechanism 10F. The main processor 10 may also be assumed to be a single board on which the above-mentioned elements are mounted.

The CPU 10A functions as the processor 1 in the above-mentioned FIG. 1, and operates the OS, and executes various programs stored in the RAM 10B. A plurality of CPUs 10A are provided in one main processor 10, and in the case in which one OS is operated by a plurality of CPUs 10A, it can be assumed that all of the plurality of CPUs 10A that operate the same OS, function as one processor 1.

The first controller 10C is for example a FPGA (Field Programmable Gate Array) or a logic circuit, and performs control of the devices included in the main processor 10. Furthermore, the first controller 10C functions as the individual monitoring unit 2 in the above-mentioned FIG. 1, and monitors the operation condition of the CPU 10A, and based on the monitoring result of the operation condition, judges whether or not a trouble has occurred in the CPU 10A. Then, the first controller 10C, when judged that a trouble has occurred in the CPU 10A, notifies the trouble occurrence to the service processor 20.

The first check register 10D and the timer register 10E are registers (storage areas) that the first controller 10C uses for monitoring the operation condition of the CPU 10A, and are set with necessary information for the monitoring processing for monitoring the operation condition of the CPU 10A. The timer mechanism 10F detects that the monitoring period for monitoring the CPU 10A by the first controller 10C has elapsed. Furthermore, in the ROM 10G, there is stored a program for controlling and monitoring, that is operated by the first controller 10C. The respective components of the main processor 10 are connected by a system bus 10H as illustrated in FIG. 2.

On the other hand, the service processor 20 functions as the administrative unit 3 in the above-mentioned FIG. 1, and includes an MPU (Micro Processing Unit) 20A, a RAM 20B, a second controller 20C, and a ROM 20E. The second controller 20C includes a plurality of second check registers 20D thereinside.

The MPU 20A performs processing of firmware stored in the RAM 20B. The MPU 20A performs processing of the firmware, to thereby implement a function of the functions of the aforementioned administrative unit 3, that performs troubleshooting processing.

The second controller 20C is for example an FPGA or a logic circuit, and mainly performs control of the devices included in the service processor 20. Furthermore, the second controller 20C receives a notification indicating that a trouble has occurred in the CPU 10A, from the first controller 10C of the plurality of main processors 10. The notification from the first controller 10C, in other words, is an interruption control instruction for the firmware operated by the service processor 20. At this time, the second controller 20C performs interruption control on the firmware being processed in the MPU 20A. On the other hand, in the MPU 20A, the firmware being processed receives the interruption control from the second controller 20C, and performs troubleshooting processing on the CPU 10A corresponding to the first controller 10C that has performed notification of the trouble occurrence.

The second check register 20D is a register that is set with an information under instruction from the first controller 10C of the main processor 10, and is used at least for trouble occurrence notification. Furthermore, in the ROM 20E there is stored a program for controlling and monitoring, that is operated by the second controller 20C. The respective components of the service processor 20 are connected by a system bus 20F as illustrated in FIG. 2.

Next is a description of the first check register 10D and the timer register 10E of the main processor 10, and the second check register 20D of the service processor 20.

The first check register 10D and the timer register 10E are registers that can be accessed from both of the first controller 10C and the CPU 10A.

Figures 3A, 3B, 3C, 4:
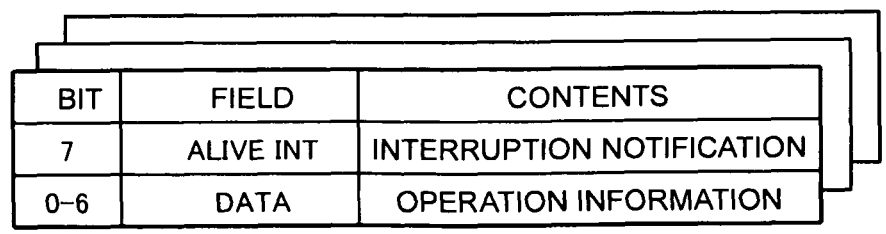
FIG. 3A is an explanatory drawing of an example of a first check register of a main processor.
FIG. 3B is an explanatory drawing of an example of a timer register of a main processor.
FIG. 3C is an explanatory drawing of an example of values set in the INTERVAL field.
FIG. 4 is an explanatory drawing of an example of a second check register of a service processor.

FIG. 3A illustrates an example of the configuration of the first check register 10D. The first check register 10D has a size of 8 bits overall, and includes an ALIVEINT field of 1 bit size, and a DATA field of 7 bits size. The ALIVEINT field is an area that holds information indicating that interruption from the main processor 10 to the service processor 20 has occurred, and when the first controller 10C has detected a trouble occurrence in the CPU 10A, the value of the ALIVEINT field is changed. Furthermore, the DATA field is an area in which operation information is set by the CPU 10A. Details of the operation information are described later.

FIG. 3B illustrates an example of the configuration of the timer register 10E. The timer register 10E has a size of 8 bits overall, and includes a RESERVED field of 1 bit size, and an INTERVAL field of 7 bits size. The RESERVED field is a spare area, and is not used in the present embodiment. The INTERVAL field is an area in which the monitoring period for monitoring the operation condition of the CPU 10A by the first controller 10C is set. FIG. 3C is a specific example of values set in the INTERVAL field, and illustrates monitoring period codes indicating the monitoring periods. For example, a monitoring period code "0000001" indicates that the monitoring period is a 30 second interval. The first controller 10C, based on the monitoring period code set in the INTERVAL field of the timer register 10E, determines the monitoring period for monitoring the CPU 10A. Then, when the monitoring period has elapsed, that is, when the timer is time out, the first controller 10C executes monitoring processing as timer interruption.

On the other hand, the second check register 20D of the service processor 20 is provided in just a number corresponding to the number of main processors 10 connected to the service processor 20. Furthermore, the second check register 20D, is a register that, when notified by a first controller 10C of any one of the main processors 10 that a trouble has occurred in the CPU 10A, the data held in the first check register 10D inside the first controller 10C that has notified the trouble occurrence is copied via the control bus 30. Regarding the second check register 20D, similarly to the first check register 10D, as illustrated in FIG. 4, each has a size of 8 bits overall, and includes an ALIVEINT field (7 bits) of 1 bit size, and a DATA field (0-6 bits) of 7 bits size.

Figure 5:
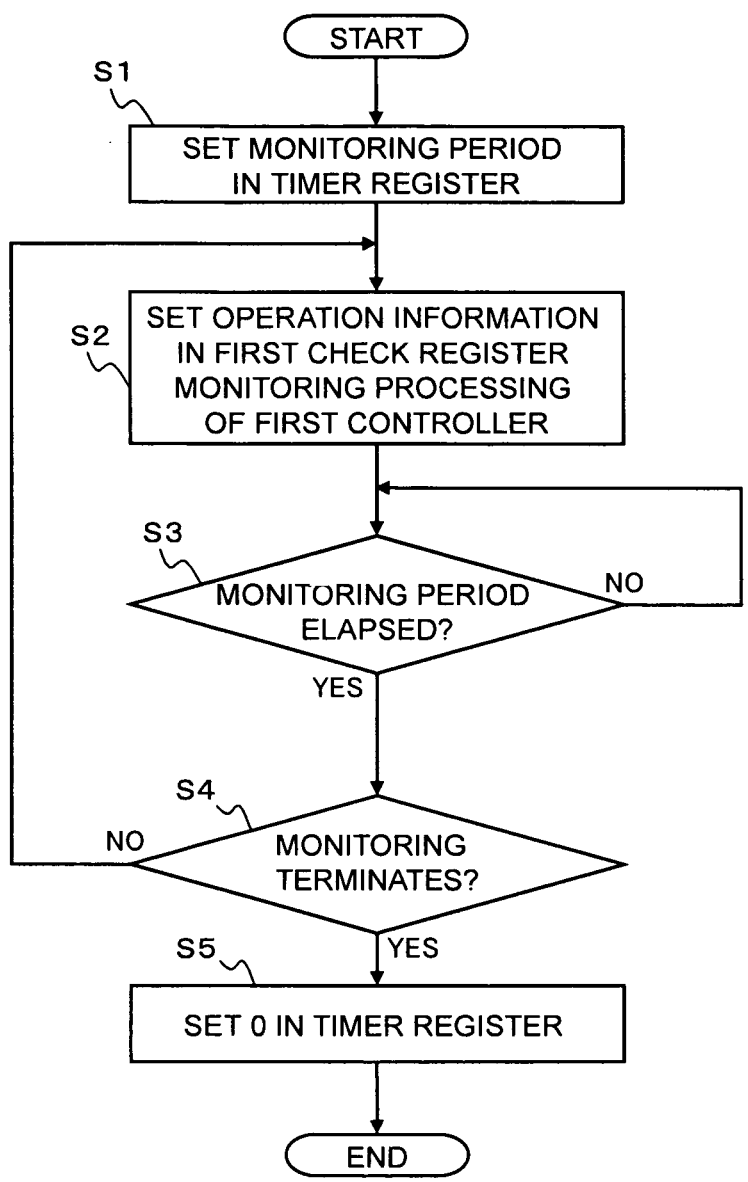
FIG. 5 is a flowchart of an example of processing in the CPU (Central Processing Unit) of the main processor.

Next is a description of an example of processing executed by the CPU 10A of the main processor 10, using the flow chart illustrated in FIG. 5. In the following description, the processing described as being performed by the CPU 10A, is precisely processing implemented by a function of the OS or the program, executed by the CPU 10A.

In S1 of FIG. 5, the CPU 10A sets a monitoring period for a first controller 10C to perform monitoring processing for monitoring the CPU 10A, in the INTERVAL field of the timer register 10E. This monitoring processing is mentioned later in the flowchart of FIG. 6. In the case in which monitoring processing is executed in the first controller 10C, the CPU 10A, in S1, sets a value other than zero ("0") as a monitoring period in the INTERVAL field. "0" is an example of a "specific value".

In S2, the CPU 10A sets new operation information in the DATA field of the first check register 10D.

Here, the new operation information may be any information provided that it is different from the information already set in the DATA field. Furthermore, the operation information itself may also be optional information. In other words, here, it is enough that, at least the conditions that the CPU 10A is operating normally and the value of the DATA field can be rewritten, are indicated. In the case in which a trouble occurs in the CPU 10A, there is the possibility that the CPU 10A may not write in new operation information in the DATA field. Conversely, in the case in which the operation information set in the DATA field is not different to the operation information set in the previous time, it can be assumed that a trouble has occurred in the CPU 10A.

Furthermore, in S2, the CPU 10A withdraws the operation information that is already set in the DATA field before setting the new operation information, that is, withdraws the operation information set in the DATA field by the CPU 10A itself in the previous time to another storage area (omitted from the diagram in FIG. 2).

In S3, the CPU 10A determines whether or not a predetermined period has elapsed. This predetermined period is shorter than the monitoring period for CPU 10A by the first controller 10C. If the predetermined period has elapsed, control proceeds to S4 (Yes), while if the predetermined period has not elapsed, control stands by as is, and again repeats the judgment of S3 (No). Here, since the predetermined time indicated in S3 is shorter than the monitoring period for monitoring the CPU 10A by the first controller 10C, the CPU 10A sets new operation information in the DATA field of the first check register 10D before the monitoring period has elapsed.

In S4, the CPU 10A determines whether or not to finish the monitoring processing by the first controller 10C. When the CPU 10A determines to finish the monitoring processing, control proceeds to S5 (Yes), while when the CPU 10A determines to continue the monitoring, processing, control returns to S2 (No).

In S5, the CPU 10A sets "0" (specific value) for the monitoring time of the timer register 10E.

Figure 6:
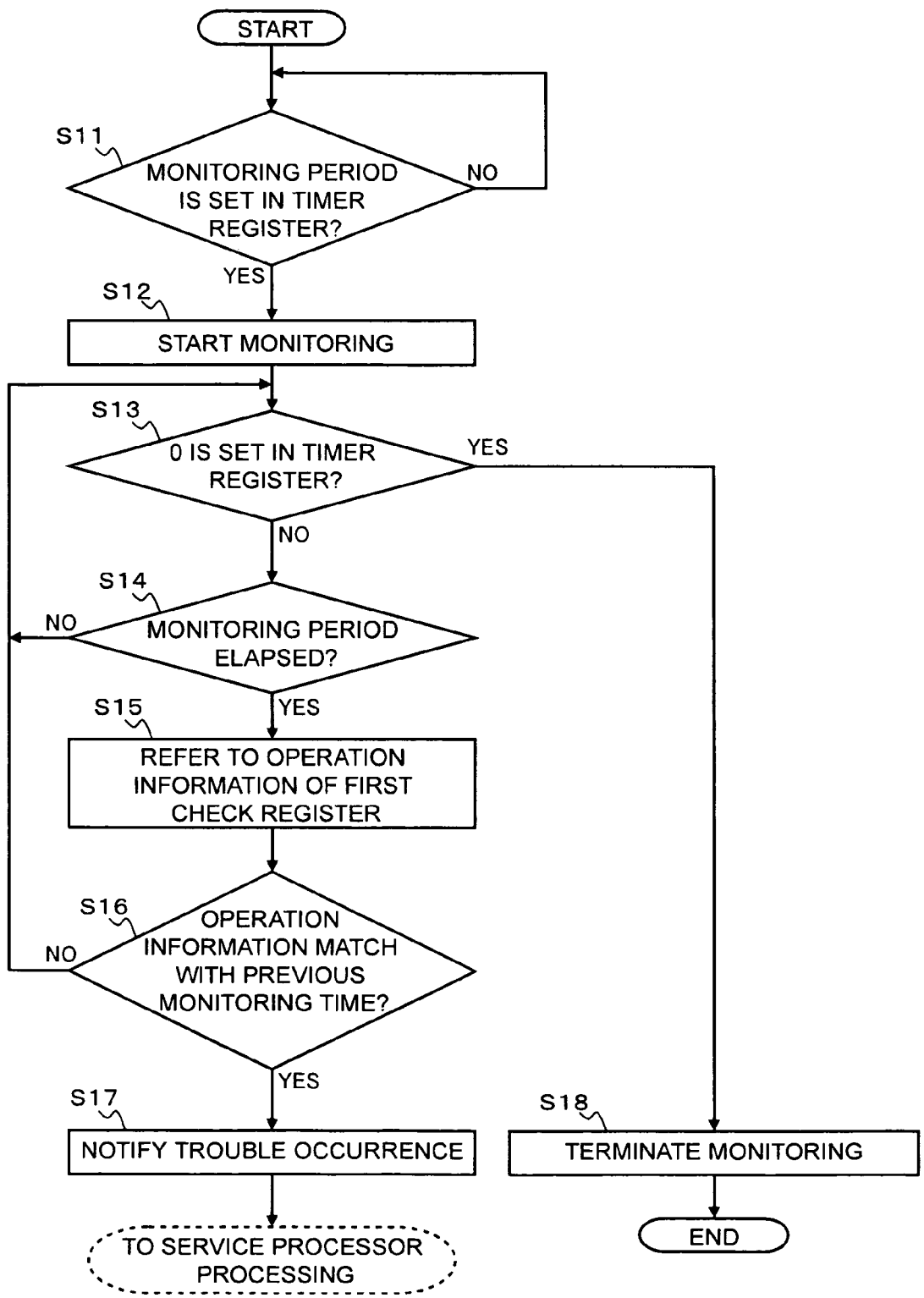
FIG. 6 is a flowchart of an example of processing in the first controller of the main processor.
Figure 7:
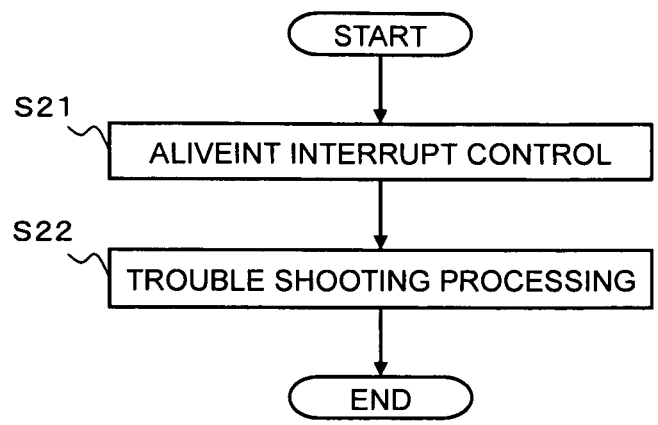
FIG. 7 is a flowchart of an example of processing in the service processor.

Next is a description of an example of processing executed by the first controller 10C of the main processor 10, using the flow chart illustrated in FIG. 6. The first controller 10C starts this processing of the CPU 10A under a condition in which a monitoring period other than "0" is set in the INTERVAL field by the CPU 10A.

In S11, the first controller 10C refers the INTERVAL field of the timer register 10E, and judges whether or not a monitoring period other than "0" is set. Then, if a monitoring period other than "0" is set, control proceeds to S12, while if a monitoring period other than "0" is not set, control stands by as is, and again repeats the judgment of S11 (No).

In S12, the first controller 10C starts the monitoring processing for monitoring the operation condition of the CPU 10A.

In S13, the first controller 10C refers the INTERVAL field of the timer register 10E, and judges whether or not a monitoring period "0" is set. Then, if a monitoring period "0" is set, control proceeds to S18, while if a monitoring period "0" is not set, control proceeds to S14.

In S14, the first controller 10C judges whether or not a monitoring period set in the INTERVAL field of the timer register 10E has elapsed since the previous monitoring processing, that is, judges whether or not a time out of the monitoring period has been generated in the timer mechanism 10F. Then, if the monitoring period has elapsed, control proceeds to S15 (Yes), while if the monitoring period has not elapsed, control returns to S13 (No).

In S15, the first controller 10C refers to the operation information set in the DATA field of the first check register 10D.

In S16, the first controller 10C compares the operation information set in the DATA field of the first check register 10D with the operation information for when the DATA field was referenced at the previous time. Since the operation information referenced at the previous time is withdrawn to the separate storage area in the S2 of the processing described in FIG. 5, the first controller 10C references the separate storage area as the operation information referenced at the previous time. Here, if the CPU 10A operates normally, the CPU 10A sets new operation information in the DATA field of the first check register 10D at an interval that is shorter than the monitoring period, according to the processing described in FIG. 5. Then, the first controller 10C judges whether or not the operation information in the DATA field of the first check register 10D and the operation information for when the DATA field was referenced at the previous time are the same. If the two are the same, control proceeds to S17 (Yes), while if the two are different to each other, control returns to S13 (No).

In S17, the first controller 10C judges if a trouble has occurred in the CPU 10A. In this case, the first controller 10C notifies the second controller 20C that a trouble has occurred in the CPU 10A. More specifically, the first controller 10C converts a value of the ALIVEINT field of the first check register 10D into a value indicating that a trouble has occurred. For example, in the case in which a value of the ALIVEINT field at normal times is "0", the first controller 10C changes the value of the ALIVEINT field to "1". Furthermore, the first controller 10C transmits data of the first check register 10D to the second controller 20C via the control bus 30. The second controller 20C copies the data transmitted from the first controller 10C to the second check register 20D. As a result, the value of the ALIVEINT field of the second check register 20D is converted to a value indicating that a fault has occurred in the CPU 10A, and the second controller 20C, by referring to the second check register 20D, can identify that a trouble has occurred in the processing of the CPU 10A of the main processors 10.

At this time, the first controller 10C also notifies information capable of specifying at least the main processor 10 on which the first controller 10C itself is mounted, that is, information capable of specifying the main processor 10 that a trouble has occurred on the service processor 20 side, altogether to the second controller 20C. Furthermore, in the case in which a plurality of CPUs 10A are provided, the main processor 10 may further notify altogether information capable of specifying the CPU 10A in which the trouble has occurred, from the first controller 10C to the second controller 20C.

On the other hand, in S16, in the case in which No is judged, the first controller 10C judges that a trouble has not occurred in the CPU 10A. In this case, the first controller 10C does not specifically issue a notification to the second controller 20C.

In S18, the first controller 10C terminates the monitoring processing for monitoring the CPU 10A.

Next, an example of the processing executed by the service processor 20 is described using the flow chart illustrated in FIG. 6. This processing is executed when a trouble occurrence notification has been received from the first controller 10C of the main processor 10. In the following description, processing described as being performed by the MPU 20A, is processing that is implemented by the function of the firmware that the MPU 20A processes.

In S21, the second controller 20C of the service processor 20 performs ALIVEINT interrupt control with respect to the firmware during MPU 20A processing.

In S22, the MPU 20A performs troubleshooting processing on the CPU 10A of the main processor 10 in which a trouble has occurred, corresponding to the interruption from the second controller 20C. More specifically, the MPU 20A collects information related to troubles from the CPU 10A and generates an error log, specifies the trouble cause from the information collected from the main processor 10, and performs processing to recover the CPU 10A from the trouble, by the remote control. For example, the MPU 20A can perform the following processing on the CPU 10A by the remote control. The MPU 20A, when interrupt control from the second controller 20C occurs, sends recovery instructions to the OS that is operated by the CPU 10A of the main processor 10. Then, the MPU 20A, when the condition is such that the OS that is operated by the CPU 10A does not receive a recovery instruction, that is, when the processing of the CPU 10A does not return to normal operation in spite of the recovery instruction and the interrupt control from an individual monitoring unit occurs again, resets the processing of the CPU 10A forcibly, and reactivates the CPU 10A. The MPU 20A in this manner is capable of performing correction processing in steps, and performing appropriate troubleshooting processing corresponding to the trouble level.

According to the information processing apparatus, the first controller 10C provided for each of the main processors 10 and functioning as an individual monitoring unit 2, monitors the operation condition of the CPU 10A functioning as a processing unit 1, for each monitoring period. Then, the first controller 10C, judges whether or not a trouble has occurred in the CPU 10A, based on the operation condition of the CPU 10A. Here, the first controller 10C, only when judged that a trouble has occurred in the CPU 10A, makes a notification to the service processor 20 that functions as the administrative unit 3. Therefore, the present information processing apparatus, compared to the case in which each of the main processors 10 directly notifies operation conditions to the service processor 20 and the service processor 20 judges whether or not a fault has occurred in the CPU, demonstrates the following operation effect. That is to say, in the present information processing apparatus, the processing for judging the presence or absence of a trouble occurrence based on the operation conditions of the CPU 10A of each of the main processors 10, is the responsibility of the first controller 10C. Therefore, it is not necessary to perform judgment of a trouble occurrence by the service processor 20, and the processing load in the service processor 20 is decreased. Furthermore, when the CPU 10A is operating normally, there is no notification from the main processor 10 to the service processor 20, and hence communication traffic of the service processor 20 can be reduced. These results mean that, even in the case in which the number of main processors 10 is large, the processing load on the service processor 20 is reduced, and furthermore, communication traffic congestion is avoided. Consequently, it is possible to prevent a delay in the troubleshooting processing by the service processor 20. Furthermore, the service processor 20, as described above, not only manages the main processor 10 but also manages other devices of the information processing apparatus, and delay in processing accompanying this management can also prevented.

In the above embodiment, only when judged by the first controller 10C that a trouble has occurred in the corresponding CPU 10A, notification is made from the main processor 10 to the service processor 20 (data copy to the second check register 20D). However, in a modified example, for example the first controller 10C, both when judged that a fault has occurred in the corresponding CPU 10A, and a fault has not occurred in the corresponding CPU 10A, may notify the judgment result to the service processor 20. In the case of this situation, compared to the method in which the main processor 10 notifies to the service processor 20 only when there is a fault occurrence as in the above embodiment, the communication traffic with respect to the service processor 20 is large. However, even in this case, on the service processor 20 side, at least just the judgment result by the first controller 10C can be acquired, and processing can be performed. That is, processing for monitoring the operation conditions of the CPUs 10A of the plurality of main processors 10, and judging whether or not a trouble has occurred in the CPU 10A need not be performed on the service processor 20 side. Consequently, it is possible to reduce the processing load on the service processor 20 and prevent delays in the fault correction processing. Furthermore, for example, even if a method is adopted that the service processor 20 side accesses the first controller 10C to confirm the judgment results, similarly, a reduction in processing load of the service processor 20 can be made by the amount that it is not necessary to perform judgment processing of whether or not a fault has occurred at least by the service processor 20.

Furthermore, in the above embodiment, the first controller 10C monitors a change in the DATA field of the first check register 10D, and judges the presence or absence of a trouble occurrence in the CPU 10A. However, the method is not limited to one that uses a register in this manner, and if the operation conditions of the CPU 10A can be confirmed at least by the first controller 10C, and the first controller 10C can be responsible for decision processing of whether or not a fault has occurred, it is possible to reduce the processing load on the service processor 20.

Furthermore, in the above embodiment, by means of the processing of the CPU 10A, an optional monitoring period can be set in the timer register 10E. On the other hand, irrespective of the processing of the CPU 10A, a monitoring period may be set beforehand in the timer register 10E.

Moreover, in the above embodiment, by making the CPU 10A set a monitoring period other than "0" in the timer register 10E, the first controller 10C starts monitoring processing, while by making the CPU 10A set "0" in the timer register 10E, the first controller 10C finishes the monitoring processing. In this way, by simply using the timer register 10E, the CPU 10A can perform control for start and finish of the monitoring processing executed by the first controller 10C. However, the method is not limited to this, and for example, also if the CPU 10A transmits a command to control the first controller 10C, it is possible to control the monitoring processing executed by the first controller 10C.

In the above hardware configuration examples, the first controller 10C that performs control of each of the devices included in the main processor 10, and further judges the presence of a trouble occurrence of the CPU 10A using a timer unit and a register, and implements a function as an individual monitoring unit 2. By such a configuration, it is not necessary to further add physical hardware for implementing the function of the individual monitoring unit 2. However, the configuration is not limited to this, and even if an device for judging the presence of a fault occurrence in the main processor 10 is separately provided, it is of course possible to reduce the processing load on the service processor 20.

Second Embodiment

Next, is a description of a second embodiment that the main processor 10 notifies a processing phase in the CPU 10A to the service processor 20, when a trouble has occurred. Contents that duplicate those in the first embodiment are omitted from the description.

The CPU 10A executes processing for a suitably different processing phase. In the second embodiment, the processing phase executed by the CPU 10A at the time of a trouble occurrence, is notified to the service processor 20, so that the condition of the CPU 10A at the time of a trouble occurrence can be easily discriminated, based on information collected by the service processor 20.

Figure 8:
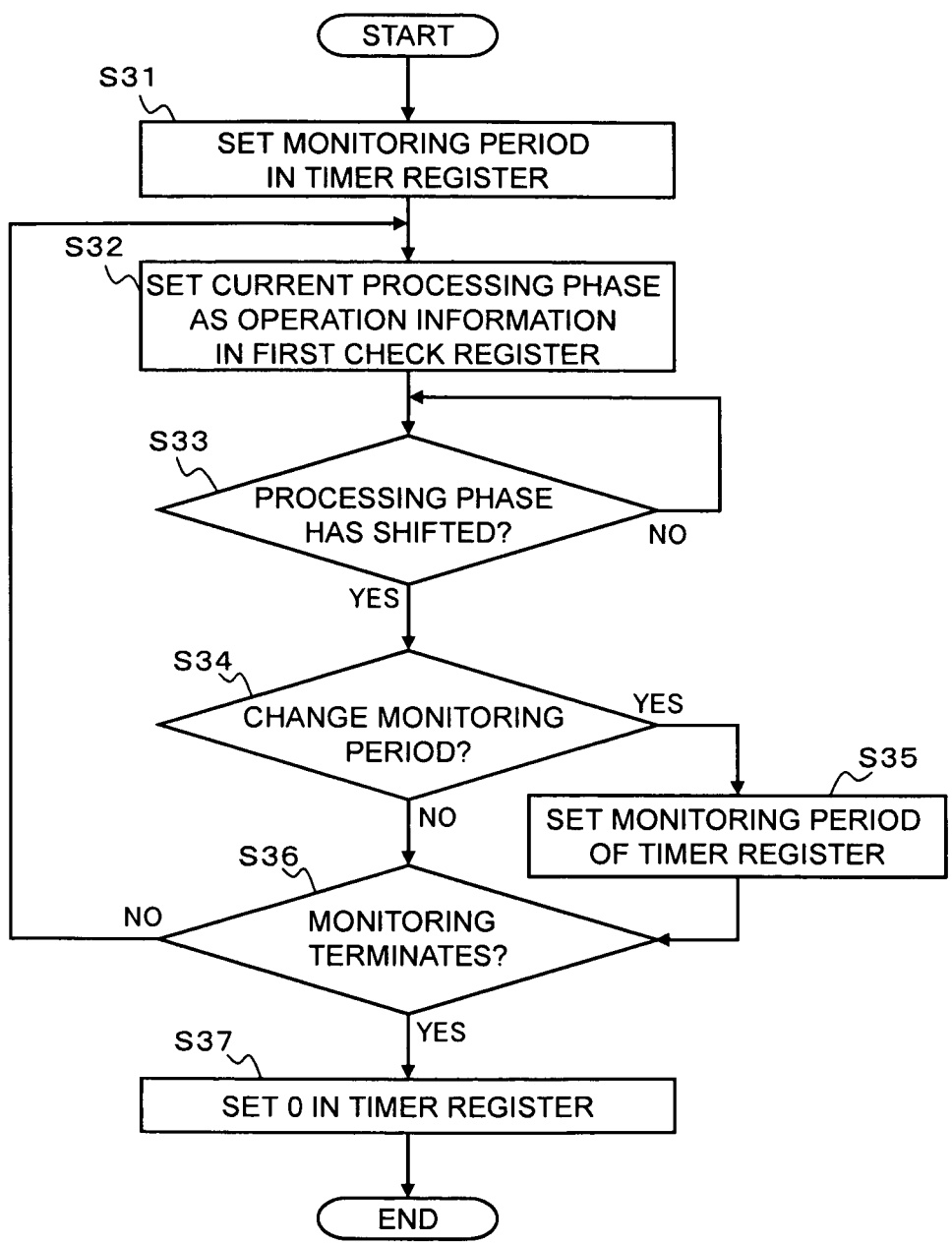
FIG. 8 is a specific example of a phase code capable of specifying a processing phase.

FIG. 8 illustrates the processing executed by the main processor 10 in the second embodiment.

In S31, the CPU 10A sets a monitoring period in the INTERVAL field of the timer register 10E, for the first controller 10C to perform the monitoring processing for monitoring the CPU 10A. The CPU 10A sets as the monitoring period, a period more than the time necessary for processing of the current processing phase of the CPU 10A. The reason for this is as follows.

That is to say, the CPU 10A must write the DATA field as a new value before the monitoring period has elapsed, and in the second embodiment, in the next S32, the current processing phase is set in the DATA field. Furthermore, the first controller 10C judges if the processing phase set in the DATA field is different before and after monitoring, by referring to the DATA field for each monitoring period. Therefore, in order for the first controller 10C to suitably judge the presence or absence of a fault occurrence of the CPU 10A, then at least before the monitoring period has elapsed, in other words, before the individual monitoring unit refers to the DATA field, it is necessary for the CPU 10A to change the processing phase set in the DATA field. The period greater than the time necessary for processing of the processing phase that is executed at a certain point in time, is set by the CPU 10A in the DATA field, so that in a state in which the CPU 10A is normally operating, when the DATA field is referred to by the first controller 10C, it can be expected the CPU 10A has completed processing of a certain processing phase, and has already started processing of the next processing phase. As a result, there is a possibility that the processing phase that the CPU 10A has set in the DATA field is different before and after referring to the DATA field by the first controller 10C.

Figures 9, 10:
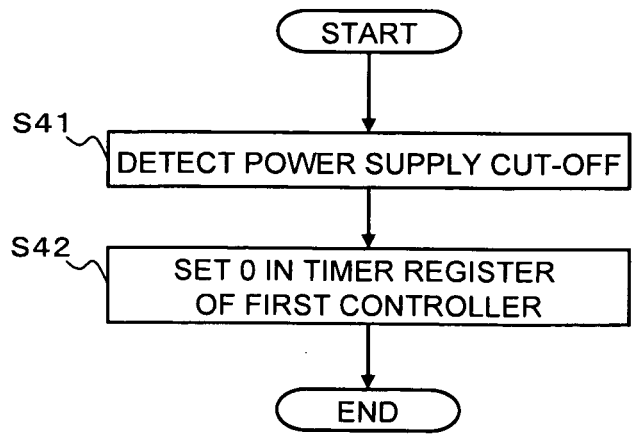

In S32, the CPU 10A sets a phase code being information capable of specifying the current processing phase by the CPU 10A, as a new operation condition, in the DATA field of the first check register 10D. FIG. 9 is a specific example of phase codes, and corresponding processing phases. FIG. 9 particularly illustrates the respective processing phases of the initial diagnosis that the CPU 10A executes at the time of start up of the information processing apparatus.

In S33, the CPU 10A determines whether or not the processing phase has shifted. If the processing phase has shifted, control proceeds to S34 (Yes), while if the predetermined period has not elapsed, control stands by as is, and again repeats the judgment of S33 (No).

In S34, the CPU 10A determines whether or not to change the setting of the monitoring period. Here, the case in which the CPU 10A changes the monitoring period, corresponds to the case in which, for example, the processing in the CPU 10A has advanced to shift the next processing phase, and the time necessary for the next processing phase is different from the time necessary for the previous processing phase. When the monitoring period changes, control proceeds to S35 (Yes), while in the case in which the monitoring period does not change, control proceeds to S36 (No).

In S35, the CPU 10A resets the monitoring period for the first controller 10C to perform monitoring processing for monitoring the CPU 10A, to the INTERVAL field of the timer register 10E. The CPU 10A, similar to in S31, sets as the monitoring period, a period greater than the time necessary for processing of the current processing phase of the CPU 10A.

S36 and S37 are similar to S4 and S5, and hence description is omitted.

The processing executed by the first controller 10C is similar to the processing indicated in the FIG. 6 of the first embodiment. At this time, in the second embodiment, in S14 of the FIG. 6, a phase code is set as the operation condition in the DATA field of the first check register 10D. Then, the data of the first check register 10D is copied to the second check register 20D also including the phase code. Therefore, the second controller 20C refers to the data copied from the first controller 10C, to thereby specify the processing phase of the processing that the CPU 10A has executed at the time of the fault occurrence.

Here, the processing of the second embodiment is described by using a specific example of the processing phase for initial diagnosis in the CPU 10A (FIG. 9), and the monitoring period (FIG. 3C). The CPU 10A, corresponding to progress of the processing phase in the initial diagnosis, sets the phase codes in sequence from "01" in the DATA field of the first check register 10D, and sets "7f" for the initial diagnosis completion time.

For example, in the case in which the processing phase in a certain monitoring time is a CPU operation confirmation test (phase code: 03), the CPU 10A sets a phase code 03 in the DATA field of the first check register 10D. Furthermore, the CPU 10A, sets a monitoring time code corresponding to a time greater than the time necessary for the processing of the CPU operation confirmation test, in the INTERVAL field of the timer register 10E. For example, in the case in which the processing time necessary for the CPU operation confirmation test is 30 seconds, the CPU 10A sets a monitoring time code 0000001 in the INTERVAL field of the timer register 10E. Then, the CPU 10A is operated normally, and in the case in which the processing of the CPU 10A shifts to RAM initialization (phase code: 04) being the next phase, the CPU 10A sets a phase code 04 corresponding to the shifted RAM initialization processing, in the DATA field of the first check register 10D, before lapse of the monitoring period set in the INTERVAL field. On the other hand, the first controller 10C, when a monitoring period of 30 seconds has elapsed from the monitoring processing of the previous time, refers to the DATA field of the first check register 10D. In the case in which the first controller 10C confirms that the phase code has changed from 03 to 04, the first controller 10C continues the monitoring of the CPU 10A. In this case, the first controller 10C, does not specifically notify to the service processor 20.

On the other hand, in the example of FIG. 9, in the case in which a trouble occurs in the processing of the CPU 10A, and the processing phase in the CPU 10A does not shift from the CPU operation confirmation test to the next processing phase, the DATA field of the first check register 10D, even if the monitoring period of 30 seconds has elapsed, remains in the phase code 03. Therefore, the first controller 10C that has referenced the DATA field, detects that a trouble has occurred in the CPU 10A. In this case, since a phase code 03 is set in the DATA field of the first check register 10D, by copying the data of the DATA field to the second check register 20D, the service processor 20 can reference the second check register 20D and identify the phase code corresponding to the processing phase of the CPU 10A at the time of problem occurrence.

In this manner, in the second embodiment, the service processor 20 can specify the processing phase of the CPU 10A of the main processor 10 at the time of the abnormality occurrence, from the phase code set in the second check register 20D. Then, by specifying the processing phase in this manner, the service processor 20 can perform properly and accurately diagnosing and the like of the fault contents, and can quickly implement recovery processing.

Furthermore, although the time necessary for processing by the processing phase is different, in the second embodiment, the CPU 10A can change the monitoring period corresponding to the processing phase. Therefore even in the monitoring processing for monitoring a change in the processing phase in this manner, the presence or absence of a trouble occurrence can be judged normally. The processing for changing the monitoring period in the first controller 10C on the CPU 10A side in this manner, is applicable without limitation to the case of setting the processing phase in the DATA field.

Third Embodiment

Next is a description of a third embodiment, in which, as a further modified example in the first embodiment and the second embodiment, the service processor 20 performs processing to stop the monitoring processing executed by the main processor 10.

In the first embodiment and the second embodiment, in the main processor 10, the CPU 10A terminates the monitoring processing executed by the first controller 10C. However in the case in which the power supply to the information processing apparatus is cut off, the administrative mechanism, i.e., the first controller 10C of the main processor 10 and the service processor 20, continues to operate. On the other hand, the specific condition in that the operation of the CPU 10A has previously stopped may occur. As an example of the condition in which the power supply to the information processing apparatus is cut off, there is a case in which a power cut occurs, or in which reboot or a power-off procedure of the information processing apparatus is performed. In this case, the operation of the CPU 10A is eventually stopped before terminating the monitoring processing for monitoring the CPU 10A executed by the first controller 10C. Therefore while the operation of the CPU 10A is stopped, the monitoring processing by the first controller 10C continues. Here, in the case in which the power supply to the information processing apparatus is cut off in the above manner, then in principle, the operation of all of the CPUs 10A of the information processing apparatus is stopped. By so doing, the following problem occurs. That is, even if the monitoring period has elapsed, none of the CPUs 10A of the information processing apparatus can set new operation information in the DATA field of the first check register 10D. Therefore, when the monitoring period has elapsed, the first controller 10C corresponding to all of the CPUs 10A, judges that a fault has occurred in a CPU 10A, and notifies a fault occurrence to the service processor 20. By so doing, the communication traffic for the service processor 20 becomes congested, and the processing load on the service processor 20 is increased.

Moreover, in particular in the case, for example, in which a user intentionally performs a reboot or power-off of the information processing apparatus, then even though the operation of the CPU 10A is stopped, it is actually not necessary to detect this as a fault occurrence. However, even in such a case, a fault occurrence is detected by the first controller 10C, and fault occurrence notification is performed.

Consequently, in the third embodiment, in the case in which the power supply to the information processing apparatus is cut off, the monitoring processing executed by the first controller 10C is terminated by the service processor 20. Since the service processor 20 implements the function of performing management of the power supply unit of the information processing apparatus as described above, the condition in which the power supply to the information processing apparatus is cut off can be detected. Contents that duplicate those in the first embodiment and the second embodiment are omitted from the description.

FIG. 10 illustrates an example of the processing executed by the service processor 20 in the third embodiment.

In S41, the second controller 20C detects a condition in which the power supply to the information processing apparatus has been cut off.

In S42, the second controller 20C sets "0 (zero)" (specified value) for the monitoring period of the timer register 10E of the first controller 10C.

When the processing of S22 by the service processor 20 is performed, the first controller 10C of the main processor 10 detects that "0 (zero)" has been set in the register ("Yes" in S13 of FIG. 6), and terminates the monitoring processing (S18 of FIG. 6).

According to the processing of the service processor 20 in the third embodiment, in the case in which the operation of the CPU 10A is stopped by cutting off the power supply to the information processing apparatus, the monitoring processing executed by the first controller 10C can be stopped by the service processor 20. Therefore, the congestion of the communication traffic for the service processor 20, and the increase in the processing load on the service processor 20 can be avoided. Moreover, in particular, in the case for example in which the user intentionally performs reboot or power-off procedure of the information processing apparatus, the situation in which unnecessary monitoring processing or fault correction processing occurs, can be avoided.

Similarly to the case in which the CPU 10A controls the monitoring processing executed by the first controller 10C, the method where the service processor 20 stops the monitoring processing executed by the first controller 10C, is not limited to the method of setting a specific value in the timer register 10E, and other control methods are also possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a plurality of processing units;
a plurality of individual monitoring units provided for each of the plurality of processing units, that monitor an operation condition of a corresponding processing unit, and judge whether or not the corresponding processing unit is operating normally, and notify the judgment result for the corresponding processing unit to outside; and
an administrative unit connected to the plurality of individual monitoring units, that receives notification of the judgment result for the corresponding processing unit only from any of the individual monitoring units, and performs troubleshooting processing on a processing unit corresponding to an individual monitoring unit that has made a notification that a corresponding processing unit is not operating normally.

2. An information processing apparatus according to claim 1, wherein each of the individual monitoring units, only when judged that a corresponding processing unit is not operating normally, notifies the judgment result to the administrative unit.

3. An information processing apparatus according to claim 1, wherein
the processing unit, before a predetermined period has elapsed, sets in a storage area capable of being referenced by a corresponding individual monitoring unit, a new operation information different from an operation information stored in the storage area, and
the individual monitoring unit refers to the storage area for each monitoring period, and when the operation information set in the storage area matches with that of a previous reference time, judges that the corresponding processing unit is operating normally.

4. An information processing apparatus according to claim 3, wherein the processing unit sets information indicating a current processing phase of the processing unit in the storage area as operation information.

5. An information processing apparatus according to claim 4, wherein the monitoring period is a period greater than a time necessary for processing of a current processing phase of the processing unit.

6. An information processing apparatus according to claim 3, wherein
the processing unit sets the monitoring period in the storage area, and
the individual monitoring unit judges whether or not the processing unit is operating normally based on the monitoring period set in the storage area.

7. An information processing apparatus according to claim 6, wherein
the individual monitoring unit, when a monitoring period other than a specified value is set in the storage area as a monitoring period, starts monitoring processing for monitoring the corresponding processing unit, while when the specified value is set in the storage area as a monitoring period, finishes monitoring processing for monitoring the corresponding processing unit.

8. An information processing apparatus comprising:
a plurality of processing units;
a plurality of individual monitoring units provided for each of the plurality of processing units that monitor an operation condition of a corresponding processing unit, and judge whether or not the corresponding processing unit is operating normally, and notify the judgment result for the corresponding processing unit to outside; and
an administrative unit connected to the plurality of individual monitoring units, that receives notification from any of the individual monitoring units, and performs troubleshooting processing on a processing unit corresponding to an individual monitoring unit that has made a notification that a corresponding processing unit is not operating normally,
wherein the administrative unit, when a condition in which power supply cut-off to any of the processing units included in the information processing apparatus is detected, terminates the monitoring processing by the individual monitoring unit that monitors the processing unit for which the power supply has been cut-off.

9. A method of information processing by a plurality of individual monitoring units, which is provided for each of a plurality of processing units, and an administrative unit connected to the plurality of individual monitoring units, the method comprising:
- monitoring, by individual monitoring units, an operation condition of a corresponding processing unit;
- judging, by the individual monitoring units, whether or not the corresponding processing unit is operating normally;
- notifying, by the individual monitoring units, the judgment result for the corresponding processing unit to the administrative unit; and
- performing, by the administrative unit that receives notification of the judgment result for the corresponding processing unit only from any of the individual monitoring units, troubleshooting processing on a processing unit corresponding to an individual monitoring unit that has made a notification that a corresponding processing unit is not operating normally.

10. A method of information processing according to claim 9, wherein each of the individual monitoring units, only when judged that a corresponding processing unit is not operating normally, notifies the judgment result to the administrative unit.

* * * * *